(12) United States Patent
Hu et al.

(10) Patent No.: US 10,621,138 B2
(45) Date of Patent: Apr. 14, 2020

(54) NETWORK COMMUNICATIONS USING POOLED MEMORY IN RACK-SCALE ARCHITECTURE

(71) Applicant: INTEL CORPORATION, Santa Clara, CA (US)

(72) Inventors: Xiao Hu, Shanghai (CN); Xiang Zhou, Shanghai (CN)

(73) Assignee: Intel Corporation, Santa Clara, CA (US)

(*) Notice: Subject to any disclaimer, the term of this patent is extended or adjusted under 35 U.S.C. 154(b) by 204 days.

(21) Appl. No.: 15/506,070

(22) PCT Filed: Sep. 25, 2014

(86) PCT No.: PCT/CN2014/087438
§ 371 (c)(1),
(2) Date: Feb. 23, 2017

(87) PCT Pub. No.: WO2016/045055
PCT Pub. Date: Mar. 31, 2016

(65) Prior Publication Data
US 2018/0225254 A1    Aug. 9, 2018

(51) Int. Cl.
G06F 15/167    (2006.01)
H04L 12/46    (2006.01)
G06F 12/02    (2006.01)
G06F 9/455    (2018.01)

(52) U.S. Cl.
CPC ........ G06F 15/167 (2013.01); G06F 9/45558 (2013.01); G06F 12/0223 (2013.01);
(Continued)

(58) Field of Classification Search
CPC .................. H04L 12/0223; H04L 12/4641
See application file for complete search history.

(56) References Cited

U.S. PATENT DOCUMENTS 6,741,589 B1    5/2004 Sang et al.
2008/0163207 A1*  7/2008 Reumann .............. G06F 9/5077
                                                                  718/1
(Continued)

FOREIGN PATENT DOCUMENTS

CN            1926616       3/2007
CN          102326147       1/2012
(Continued)

OTHER PUBLICATIONS

Extended European search report for European patent application No. 14902444.0 dated Apr. 6, 2018 (6 pages).
(Continued)

*Primary Examiner* — Jason D Recek
(74) *Attorney, Agent, or Firm* — Barnes & Thornburg

(57) ABSTRACT

Technologies for network communication using pooled memory include a computing rack having a pooled memory enclosure with a pooled memory controller and a compute enclosure having two or more compute nodes. A first compute node determines a destination virtual network interface controller identifier (vNIC ID) associated with a destination network address. The first compute node transmits a send message to the pooled memory controller that includes the destination vNIC ID and a sender physical address of packet data within the pooled memory. The pooled memory controller transmits a receive message to a second compute node associated with the destination vNIC ID. The second compute node transmits a receiver physical address of a receive buffer within the pooled memory to the pooled memory controller. The pooled memory controller copies the packet data from the sender physical address to the receiver physical address. Other embodiments are described and claimed.

10 Claims, 5 Drawing Sheets

(52) U.S. Cl.
CPC ............... *H04L 12/4641* (2013.01); *G06F 2009/45595* (2013.01); *G06F 2212/1024* (2013.01); *G06F 2212/154* (2013.01); *G06F 2212/163* (2013.01)

(56) References Cited

U.S. PATENT DOCUMENTS

| | | |
|---|---|---|
| 2008/0228995 A1 | 9/2008 | Tan et al. |
| 2009/0219935 A1 | 9/2009 | Tripathi |
| 2010/0223419 A1 | 9/2010 | Cardona et al. |
| 2011/0125974 A1* | 5/2011 | Anderson ............ G06F 12/084 711/153 |
| 2015/0242327 A1* | 8/2015 | Guthrie ............... G06F 12/0891 711/122 |

FOREIGN PATENT DOCUMENTS

| | | |
|---|---|---|
| CN | 103905309 | 7/2014 |
| WO | 2013173181 | 11/2013 |

OTHER PUBLICATIONS

First Office action in Chinese patent application No. 201480081459.7, dated Jun. 26, 2019, including machine translation.
International Search Report for PCT application No. PCT/CN2014/087438, dated Jun. 19, 2015 (3 pages).
Written Opinion for PCT application No. PCT/CN2014/087438, dated Jun. 19, 2015 (4 pages).

* cited by examiner

NETWORK COMMUNICATIONS USING POOLED MEMORY IN RACK-SCALE ARCHITECTURE

CROSS REFERENCE TO RELATED APPLICATIONS

This application is a national stage entry under 35 USC § 371(b) of International Application No. PCT/CN2014/087438, which was filed Sep. 25, 2014.

BACKGROUND

Traditional computer data centers are based around the server as the fundamental unit of computing. Each server typically includes its own dedicated computing resources including processors, memory, disk storage, and networking hardware and software. Individual servers may be stacked together with high density into racks, and multiple racks may be arranged in a data center.

Some current datacenter technologies aim to disaggregate computing resources. In particular, rack-scale architecture recasts the computing rack as the fundamental unit of computing for large datacenters. Each rack may include collections of pooled compute nodes, pooled memory, and pooled storage. By disaggregating and pooling computing resources, rack-scale architecture may improve the flexibility and scalability of datacenters, for example by allowing computing resources (e.g., compute nodes and/or memory) to be dynamically added and/or partitioned among workloads. Additionally, rack-scale architecture may improve data center thermal management and power consumption, which may in turn improve compute density, performance, and efficiency.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
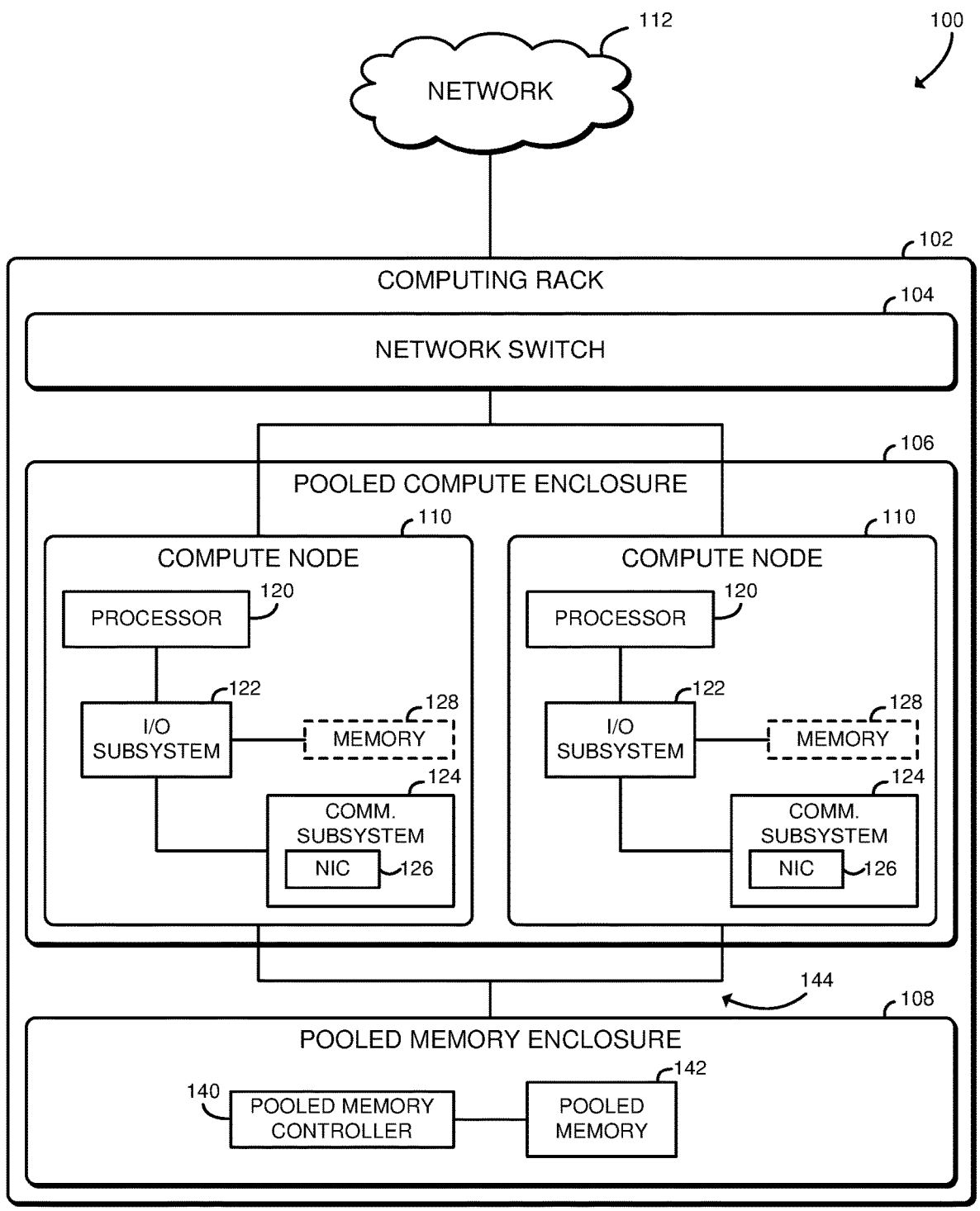
FIG. 1 is a simplified block diagram of at least one embodiment of a system for network communication using pooled memory in a rack-scale computing architecture.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for network communication using pooled memory in a rack-scale computing architecture includes a computing rack 102 including a network switch 104, a pooled compute enclosure 106, and a pooled memory enclosure 108. The pooled compute enclosure 106 includes one or more compute nodes 110. Each of the compute nodes 110 is capable of using pooled memory of the pooled memory enclosure 108 as system memory. In use, a network packet bound from a source compute node 110 to a destination compute node 110 within the same computing rack 102 is handled by one or more virtual network interface controllers (vNICs) of the compute nodes 110. Rather than transmitting the packet data via the network switch 104, the compute node(s) 110 send messages to the pooled memory enclosure 108, and the pooled memory enclosure 108 copies the packet data within the pooled memory, without causing network traffic over the network switch 104. Thus, the computing rack 102 may improve networking throughput and reduce latency by avoiding copying data multiple times between the pooled memory enclosure 108, the compute nodes 110, and/or the network switch 104.

The computing rack 102 may be embodied as a modular computing device that, alone or in combination with other computing racks 102, is capable of performing the functions described herein. For example, the computing rack 102 may be embodied as a chassis or other enclosure for rack-mounting modular computing units such as compute trays, storage trays, network trays, or traditional rack-mounted components such as servers or switches. As shown in FIG. 1, the computing rack 102 illustratively includes the network switch 104, the pooled compute enclosure 106, and the pooled memory enclosure 108. The computing rack 102 may also include additional pooled computing resources, such as pooled storage and pooled networking, as well as associated interconnects, peripheral devices, power supplies, thermal management systems, and other components. Additionally, although illustrated as including a single network switch 104, pooled compute enclosure 106, and pooled memory enclosure 108, it should be understood that in some embodiments the computing rack 102 may include more than one of each of those devices.

The pooled compute enclosure 106 may be embodied as any chassis, tray, module, or other enclosure capable of supporting the compute nodes 110 and any associated interconnects, power supplies, thermal management systems, or other associated components. Although illustrated as including two compute nodes 110, it should be understood that the pooled compute enclosure 106 may include three or more compute nodes 110 in other embodiments, and in some embodiments those compute nodes 110 may be hot-swappable or otherwise configurable.

Each compute node 110 may be embodied as any type of device capable of performing the functions described herein. For example, the compute node 110 may be embodied as, without limitation, one or more server computing devices, computer mainboards, daughtercards, or expansion cards, system-on-a-chips, computer processors, consumer electronic devices, smart appliances, and/or any other computing device or collection of devices capable of processing network communication. As shown in FIG. 1, each illustrative compute node 110 includes a processor 120, an I/O subsystem 122, a communication subsystem 124, and may include memory 128. Of course, the compute node 110 may include other or additional components, such as those commonly found in a server computer (e.g., various input/output devices), in other embodiments. Additionally, in some embodiments, one or more of the illustrative components may be incorporated in, or otherwise from a portion of, another component. For example, the memory 128, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Although illustrated as a single processor 120, in some embodiments each compute node 110 may include multiple processors 120. Similarly, the I/O subsystem 122 may be embodied as circuitry and/or components to facilitate input/output operations with the processor 120, the communication subsystem 124, the memory 128, and other components of the compute node 110. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the communication subsystem 124, the memory 128, and other components of the compute node 110, on a single integrated circuit chip.

The compute node 110 further includes communication subsystem 124, which may be embodied as any communication circuit, device, or collection thereof, capable of enabling communications between the compute node 110, the network switch 104, and/or other remote devices. The communication subsystem 124 may be configured to use any one or more communication technology (e.g., wireless or wired communications) and associated protocols (e.g., Ethernet, Bluetooth®, Wi-Fi®, WiMAX, etc.) to effect such communication. In the illustrative embodiment, the communication subsystem 124 includes a network interface controller (NIC) 126, used to communicate network packets with the network switch 104.

The memory 128 may be embodied as any type of volatile or non-volatile memory or data storage capable of performing the functions described herein. In operation, the memory 128 may store various data and software used during operation of the compute node 110 such as operating systems, applications, programs, libraries, and drivers. In some embodiments the memory 128 may temporarily cache or otherwise store data maintained by the pooled memory enclosure 108. As shown, in some embodiments the compute node 110 may not include any dedicated on-board memory 128.

The pooled memory enclosure 108 may be embodied as any chassis, tray, module, or other enclosure capable of receiving memory modules that are to be pooled and accessed by the compute nodes 110. The pooled memory enclosure 108 includes a pooled memory controller 140 and a pooled memory 142. The pooled memory controller 140 may be embodied as any computer, processor, microcontroller, or other computing device capable of providing the compute nodes 110 access to the pooled memory 142 and otherwise performing the functions described herein. For example, the pooled memory controller 140 may be embodied as, without limitation, a server computing device, a computer mainboard or daughtercard, a system-on-a-chip, a computer processor, a consumer electronic device, a smart appliance, and/or any other computing device capable of performing the functions described herein.

The pooled memory 142 may be embodied as any type of volatile or non-volatile memory or data storage capable of performing the functions described herein. For example, the pooled memory 142 may be embodied as a large number of conventional RAM DIMMs. In operation, each of the compute nodes 110 may use the pooled memory 142 as main memory. Thus, the pooled memory 142 may store various data and software used during operation of each of the compute nodes 110 such as operating systems, applications, programs, libraries, and drivers. In some embodiments, the pooled memory controller 140 may partition or otherwise isolate segments of the pooled memory 142 among the compute nodes 110.

As shown in FIG. 1, the pooled memory enclosure 108 is coupled to each of the compute nodes 110 via an interconnect 144. The interconnect 144 may be embodied as any high-speed interconnect capable of transferring data while supporting memory semantics. The interconnect 144 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate data transfer between the compute nodes 110 and the pooled memory enclosure 108. For example, in some embodiments, the interconnect 144 may be embodied as or include a silicon photonics switch fabric and a number of optical interconnects. As another example, the interconnect 144 may be embodied as or include a copper backplane.

The network switch 104 may be embodied as any networking device capable of switching network packets between the compute nodes 110 and/or other remote computing devices (e.g., compute nodes 110 of other computing racks 102). For example, the network switch 104 may be embodied as a top-of-rack switch or other Ethernet switch.

The computing rack 102 may be configured to transmit and receive data with remote devices, such as other computing racks 102 (not shown), over a network 112. The network 112 may be embodied as any number of various wired and/or wireless networks. For example, the network 112 may be embodied as, or otherwise include, a wired or wireless local area network (LAN), a wired or wireless wide area network (WAN), and/or a publicly-accessible, global network such as the Internet. As such, the network 112 may include any number of additional devices, such as additional computers, routers, and switches, to facilitate communications among the devices of the system 100.

Figure 2:
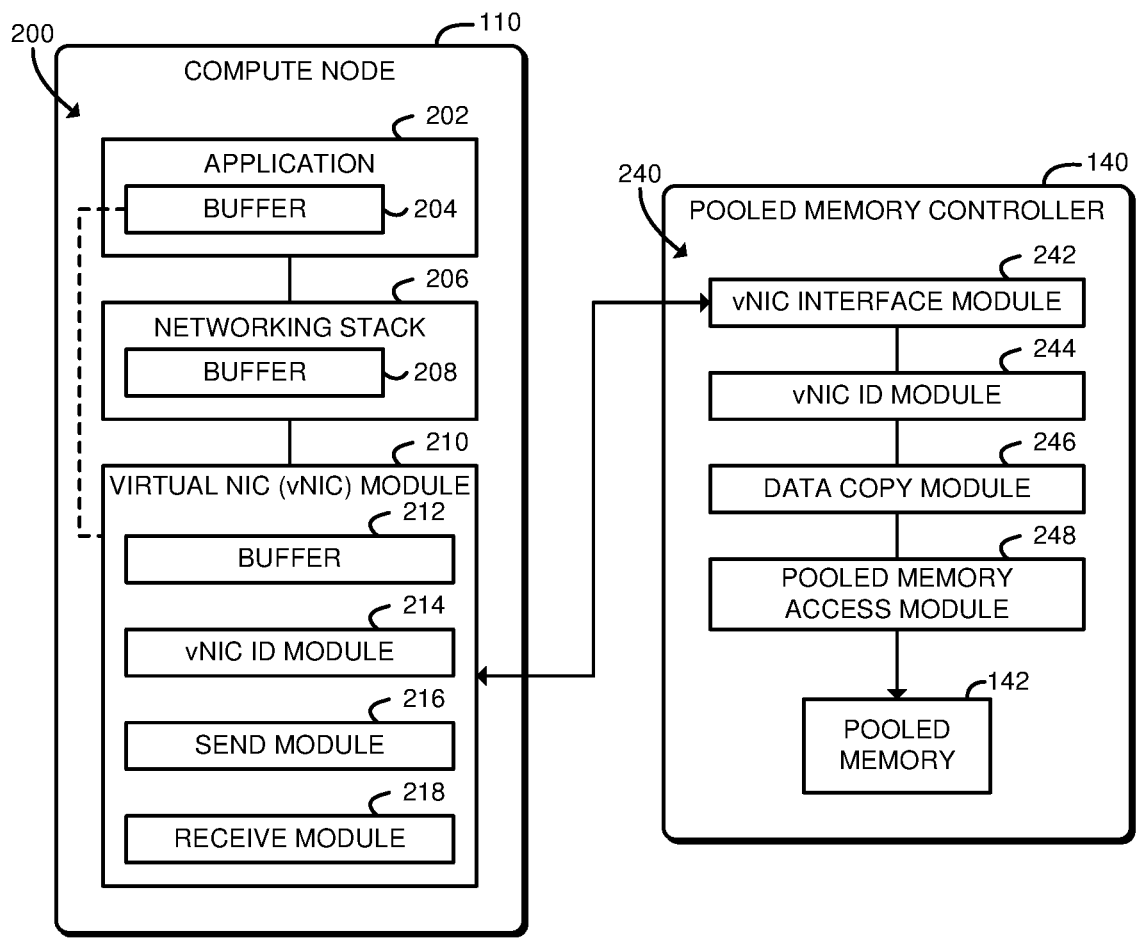
FIG. 2 is a simplified block diagram of at least one embodiment of several environments of the system of FIG. 1.

Referring now to FIG. 2, in the illustrative embodiment, each compute node 110 establishes an environment 200 during operation. The illustrative environment 200 includes an application 202, a networking stack 206, and a virtual NIC (vNIC) module 210. The various modules of the environment 200 may be embodied as hardware, firmware, software, or a combination thereof. For example, each of the modules, logic, and other components of the environment 200 may form a portion of, or otherwise be established by, the processor 120 or other hardware components of the compute node 110.

The application 202 is configured to send and receive network packet data with one or more other compute nodes 110 of the computing rack 102. For example, the application 202 may be embodied as a server application, a client application, or any combination of network applications. The application 202 may maintain one or more application buffers 204 used to store packet data. Each application buffer 204 may be established in user-mode memory space, and may be identified by a physical memory address of the compute node 110. Each application buffer 204 may be stored in the pooled memory 142 by the pooled memory controller 140.

The networking stack 206 is configured to provide networking services to the application 202. For example, the networking stack 206 may provide TCP/IP networking services to the application 202. The networking stack 206 may embodied as one or more supporting applications, libraries, operating system components, device drivers, or other components used to provide networking services. The networking stack 206 may include one or more networking stack buffers 208 used to store packet data. In some embodiments, each networking stack buffer 208 may be maintained in kernel memory space, and may be identified by a physical memory address of the compute node 110. Each networking stack buffer 208 may be stored in the pooled memory 142 by the pooled memory controller 140.

The vNIC module 210 is configured to emulate a NIC and exchange control messages with the pooled memory controller 140 to communicate packet data with another compute node 110. In some embodiments, the vNIC module 210 may be embodied as a kernel module, device driver, or other component capable of interfacing with the networking stack 206. The vNIC module 210 may include one or more vNIC buffers 212 used to store packet data. In some embodiments, each vNIC buffer 212 may be maintained in kernel memory space, and may be identified by a physical memory address of the compute node 110. Each vNIC buffer 212 may be stored in the pooled memory 142 by the pooled memory controller 140.

The vNIC module 210 is further configured to generate, store, or otherwise determine a unique identifier, known as a vNIC ID. The vNIC module 210 is further configured to determine the destination vNIC ID associated with the destination network address of a network packet. The vNIC module 210 is configured to generate a "send" message including the source vNIC ID of the current vNIC module 210, the destination vNIC ID of the destination vNIC module 210, the size of the packet data, and the physical memory address of the packet data. The vNIC module 210 is further configured to transmit the send message to the pooled memory controller 140. Additionally, the vNIC module 210 is configured to receive a "receive" message from the pooled memory controller 140, and in response to the receive message identify a physical memory address of a pooled memory buffer to receive the packet data (e.g., the vNIC buffer 212, the networking stack buffer 208, or the application buffer 204) and transmit the physical memory address of the receive buffer to the pooled memory controller 140. The vNIC module 210 may also be configured to handle one or more interrupts received by the compute node 110 from the pooled memory controller 140. In some embodiments, those functions may be performed by sub-modules, such as a vNIC ID module 214, a send module 216, and/or a receive module 218.

Still referring to FIG. 2, in the illustrative embodiment, the pooled memory controller 140 establishes an environment 240 during operation. The illustrative environment 240 includes a vNIC interface module 242, a vNIC ID module 244, a data copy module 246, and a pooled memory access module 248. The various modules of the environment 240 may be embodied as hardware, firmware, software, or a combination thereof. For example, each of the modules, logic, and other components of the environment 240 may form a portion of, or otherwise be established by, the pooled memory controller 140 or other hardware components of the pooled memory enclosure 108.

The vNIC interface module 242 is configured to communicate send messages and receive messages with the vNIC modules 210 of one or more compute nodes 110. The vNIC interface module 242 may establish a dedicated I/O space for each vNIC module 210, such as one or more control registers. That I/O space may be mapped to the physical memory space of the associated compute node 110. Thus, the pooled memory controller 140 and the compute node 110 may communicate messages by writing data at predefined memory addresses. The vNIC interface module 242 may also be configured to generate one or more interrupts to the compute nodes 110 to coordinate the transmission of messages.

The vNIC ID module 244 is configured to associate the vNIC ID of each vNIC module 210 with the network address of the associated compute node 110. The network address may include, for example, an IP address or other high-level network address associated with the compute node 110. The vNIC ID module 244 may determine, for example, the destination compute node 110 associated with the destination vNIC ID specified in a "send" message received from a compute node 110.

The data copy module 246 is configured to copy data within the pooled memory 142, from a sender physical address associated with a source vNIC module 210 to a receiver physical address associated with a destination vNIC module 210. The data copy module 246 copies the data in response to receiving the receiver physical address from the destination compute node 110. The data copy module 246 may copy the data directly between data buffers stored within the pooled memory 142 (e.g., between vNIC buffers 212, networking stack buffers 208, and/or application buffers 204).

The pooled memory access module 248 is configured to allow the compute node 110 to remotely access the pooled memory 142. The application 202 and/or other modules of the environment 200 may access the pooled memory 142 as system memory. In particular, as described above, the application buffer 204, the networking stack buffer 208, and the vNIC buffer 212 may be stored in the pooled memory 142 and accessed via the pooled memory access module 248. In some embodiments, some or all of the pooled memory 142 may be isolated, partitioned, or otherwise dedicated to particular compute nodes 110.

Figure 3:
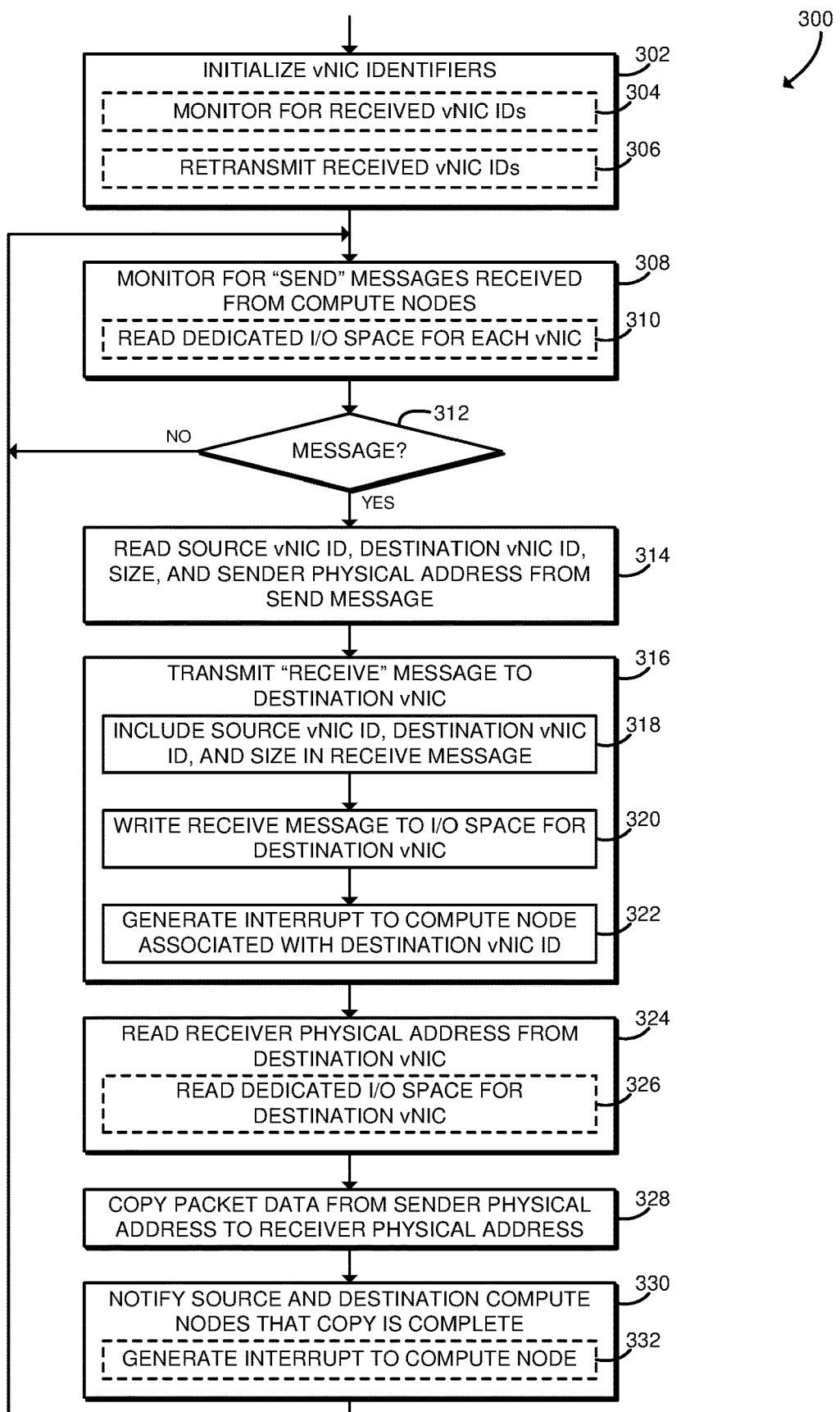
FIG. 3 is a simplified flow diagram of at least one embodiment of a method for network communication using pooled memory that may executed by a pooled memory controller of FIGS. 1 and 2.

Referring now to FIG. 3, in use, the pooled memory controller 140 may execute a method 300 for network communication using pooled memory. The method 300 begins with block 302, in which the pooled memory controller 140 initializes the vNIC IDs associated with the compute nodes 110 of the computing rack 102. In particular, the pooled memory controller 140 associates the vNIC ID of each compute node 110 with the network address (e.g., IP address) of the corresponding compute node 110. After initialization, the pooled memory controller 140 and all of the compute nodes 110 may be capable of mapping between network addresses and vNIC IDs. Thus, the vNIC ID may be used similarly to a traditional MAC address to identify compute nodes 110 at the MAC layer. The pooled memory controller 140 may use any technique to obtain the vNIC IDs from the compute nodes 110 and propagate the vNIC IDs to other compute nodes 110. In some embodiments, in block 304, the pooled memory controller 140 may monitor for vNIC IDs received from the compute nodes 110. The compute nodes 110 may, for example, directly transmit the vNIC IDs to the pooled memory controller 140 or may broadcast the vNIC IDs to many attached devices. In some embodiments, in block 306 the pooled memory controller 140 may retransmit the received vNIC IDs to other compute nodes 110.

In block 308, the pooled memory controller 140 monitors for "send" messages received from the compute nodes 110. The pooled memory controller 140 may use any technique to monitor for messages from the compute nodes 110. In block 310, in some embodiments the pooled memory controller 140 may read from an I/O space that has been dedicated to the vNIC of each compute node 110. The I/O space may be embodied as any memory region accessible to the compute node 110 and usable to transfer information to the pooled memory controller 140. For example, the I/O space may include one or more control registers of the pooled memory controller 140. In block 312, the pooled memory controller 140 determines whether any send messages have been received. If not, the method 300 loops back to block 308 to continue monitoring for send messages. If a send message has been received, the method 300 advances to block 314.

In block 314, the pooled memory controller 140 reads the send message and extracts its included values. In particular, the pooled memory controller 140 reads a source vNIC ID, a destination vNIC ID, a packet size, and a sender physical memory address from the send message. The source vNIC ID and the destination vNIC ID represent the vNIC IDs corresponding to the source compute node 110 and the destination compute node 110, respectively. The packet size represents the amount of packet data (e.g., a number of bytes or octets) to be transferred. The sender physical memory address represents the starting physical address of the packet data within the pooled memory 142. Thus, the sender physical memory address represents the memory address for the packet data used by the source compute node 110.

In block 316, the pooled memory controller 140 transmits a "receive" message to the destination vNIC specified by the destination vNIC ID of the send message. In block 318, the pooled memory controller 140 includes in the receive message the source vNIC ID, the destination vNIC ID, and the packet size. In block 320, the pooled memory controller 140 writes the receive message into the I/O space dedicated to the destination vNIC. In block 322, the pooled memory controller 140 generates an interrupt to the compute node 110 associated with the destination vNIC ID. The pooled memory controller 140 may identify the network address of the compute node 110 or otherwise identify the compute node 110 in order to identify the destination compute node 110 and/or generate the interrupt. As described further below in connection with FIG. 5, the destination compute node 110 may read the receive message from its dedicated I/O space after receiving the interrupt.

In block 324, the pooled memory controller 140 reads a receiver physical memory address from the destination vNIC. The receiver physical memory address represents the starting physical address of a buffer within the pooled memory 142 that can receive the packet data. Thus, the receiver physical memory address represents the memory address for the buffer used by the destination compute node 110. The pooled memory controller 140 may use any technique to read the receiver physical memory address. In some embodiments, in block 326, the pooled memory controller 140 may read the I/O space dedicated to the destination vNIC.

In block 328, the pooled memory controller 140 copies the packet data from the sender physical memory address to the receiver physical memory address, within the pooled memory 142. In other words, the pooled memory controller 140 copies the packet size amount of data from the packet data of the source compute node 110 into the receive buffer of the destination compute node 110. Because the packet data is copied within the pooled memory 142, the packet data is not copied across the interconnect 144 between the pooled memory enclosure 108 and the compute nodes 110, and the packet data is also not copied across the network switch 104 and/or the network 112.

In block 330, the pooled memory controller 140 notifies the source compute node 110 and the destination compute node 110 that the packet data copy is complete. The pooled memory controller 140 may use any technique to notify the compute nodes 110. In some embodiments, in block 332, the pooled memory controller 140 may generate an interrupt to each compute node 110. After notifying the compute nodes 110, the method 300 loops back to block 308 to monitor for additional send messages.

Figure 4:
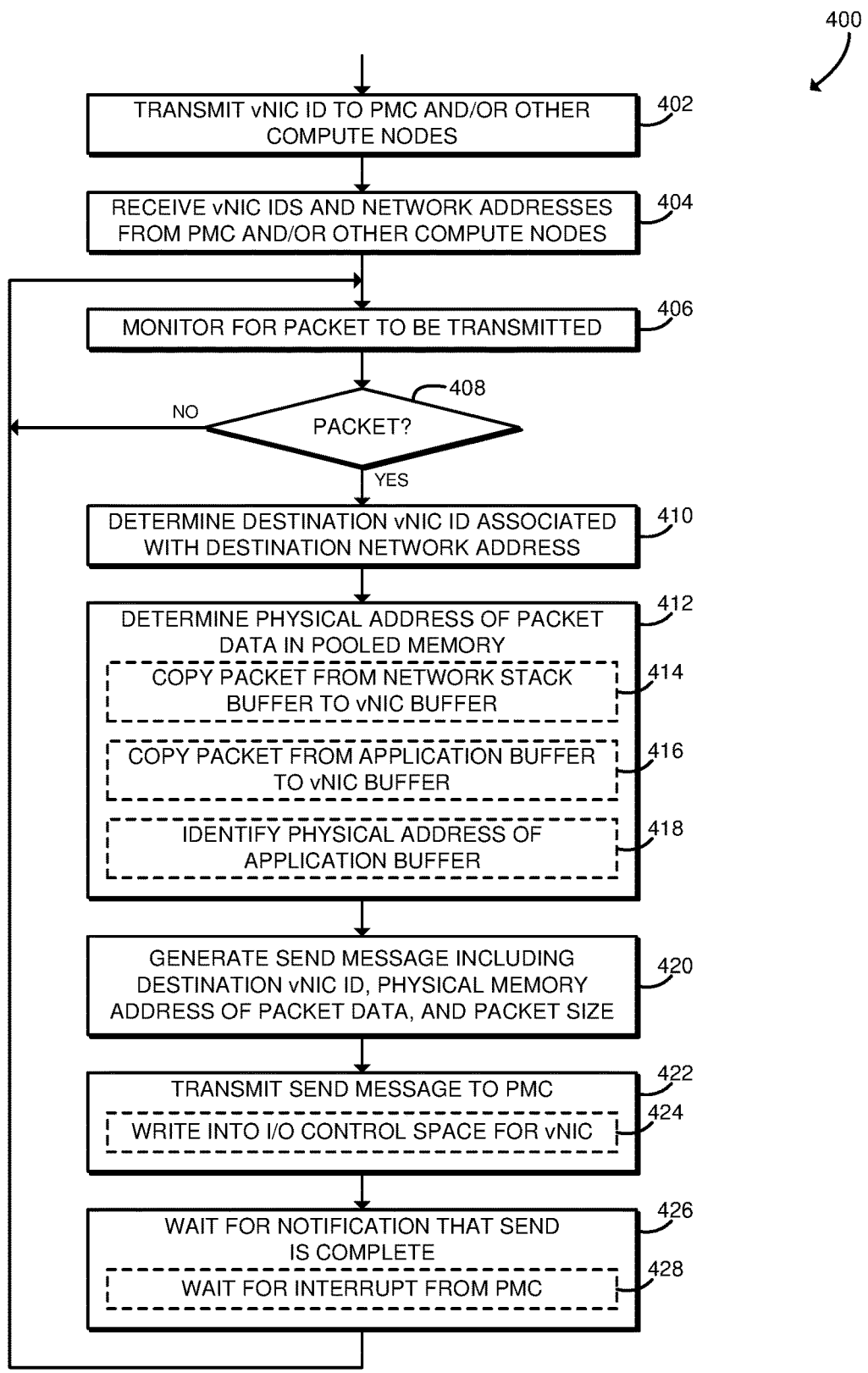
FIG. 4 is a simplified flow diagram of at least one embodiment of a method for sending network data using pooled memory that may executed by a compute node of FIGS. 1 and 2.

Referring now to FIG. 4, in use, a compute node 110 may execute a method 400 for transmitting network packets using pooled memory. The method 400 begins with block 402, in which the compute node 110 transmits its vNIC ID to the pooled memory controller 140 and/or to other compute nodes 110 of the computing rack 102. The compute node 110 may, for example, directly transmit its vNIC ID to the pooled memory controller 140 or may broadcast its vNIC ID to many attached devices. In block 404, the compute node 110 receives vNIC IDs and associated network addresses from the pooled memory controller 140 and/or other compute nodes 110. For example, the compute node 110 may receive the vNIC ID directly from the pooled memory controller 140 or may listen for broadcast messages from other devices. After receiving the vNIC IDs and network addresses, the compute node 110 may be capable of determining the vNIC ID associated with the network address of any of the compute nodes 110 of the computing rack 102.

In block 406, the compute node 110 monitors for a network packet to be transmitted to another compute node 110 of the computing rack 102. The compute node 110 may use any technique to monitor for network packets. For example, the compute node 110 may determine whether an application 202 has submitted a network packet for transmission to the networking stack 206. The compute node 110 may also determine whether the network packet is addressed to a compute node 110 within the computing rack 102. Although illustrated as the compute node 110 monitoring for the network packet, it should be understood that in some embodiments the application 202 may directly initiate a network transmission operation, without the compute node 110 performing any polling for network packets. In some embodiments, the application 202 may bypass the networking stack 206 and may submit the network packet directly to the vNIC module 210 for transmission. In block 408, the compute node 110 determines whether a network packet is ready to be transmitted. If not, the method 400 loops back to block 406 to continue monitoring for packets. If a network packet is ready to be transmitted, the method 400 advances to block 410.

In block 410, the compute node 110 determines the destination vNIC ID associated with the destination network address of the network packet. For example, the compute node 110 may determine the destination vNIC ID based on the destination IP address of the network packet. Of course, if the destination IP address does not resolve to a compute node 110 within the computing rack 102, then no associated vNIC ID will exist, and the compute node 110 may process the network packet using the networking stack 206 and the MC 126.

In block 412, the compute node 110 determines a physical address of the packet data in the pooled memory 142. The physical address refers to the source location in the pooled memory 142 of the packet data that will be transmitted to the destination vNIC. For example, the physical address may refer to one of the application buffer 204, the networking stack buffer 208, or the vNIC buffer 212 maintained by the application 202, the networking stack 206, and the vNIC module 210, respectively. In some embodiments, in block 414 the compute node 110 may copy the packet data from the networking stack buffer 208 managed by the networking stack 206 into the vNIC buffer 212 managed by the vNIC module 210. In those embodiments, the physical address of the packet data may be located within the vNIC buffer 212. For example, in many embodiments, the packet data may be copied from the application buffer 204 into the networking stack buffer 208, and then copied again into the vNIC buffer 212. Thus, because the buffers 204, 208, 212 are stored in the pooled memory 142, in those embodiments the same packet data may be copied several times over the interconnect 144 between the compute nodes 110 and the pooled memory enclosure 108.

In some embodiments, in block 416, the compute node 110 may copy the packet data from the application buffer 204 directly into the vNIC buffer 212. In those embodiments, the physical address of the packet data may also be located within the vNIC buffer 212. Thus, as compared to copying from the application buffer 204 to the networking stack buffer 208, one or more copies of the packet data between the compute node 110 and the pooled memory enclosure 108 may be avoided. In some embodiments, in block 418, the compute node 110 may identify the physical address of the packet data within the application buffer 204 itself. In those embodiments, no additional copies of the packet data may be transmitted over the interconnect 144 between the compute node 110 and the pooled memory enclosure 108.

In block 420, the compute node 110 generates a "send" message including the destination vNIC ID, the source vNIC ID, the physical memory address of the packet data, and the packet size. In block 422, the compute node 110 transmits the send message to the pooled memory controller 140. The compute node 110 may use any technique to transmit the send message. In some embodiments, in block 424, the compute node 110 may write the send message into I/O space dedicated to the vNIC module 210. As described above in connection with block 310 of FIG. 3, the pooled memory controller 140 may monitor the dedicated I/O space for send messages from the vNIC module 210.

In block 426, the compute node 110 waits for a notification from the pooled memory controller 140 that the network packet send is complete. As described above in connection with FIG. 3, in response to receiving the send message, the pooled memory controller 140 copies the packet data from the physical memory location associated with the source compute node 110 into another physical location within the pooled memory 142 associated with the destination compute node 110. The compute node 110 may use any technique to wait for notification from the pooled memory controller 140. In some embodiments, in block 428, the compute node 110 waits for an interrupt generated by the pooled memory controller 140. After receiving a notification that the send operation is complete, the method 400 loops back to block 406 to monitor for additional network packets.

Figure 5:
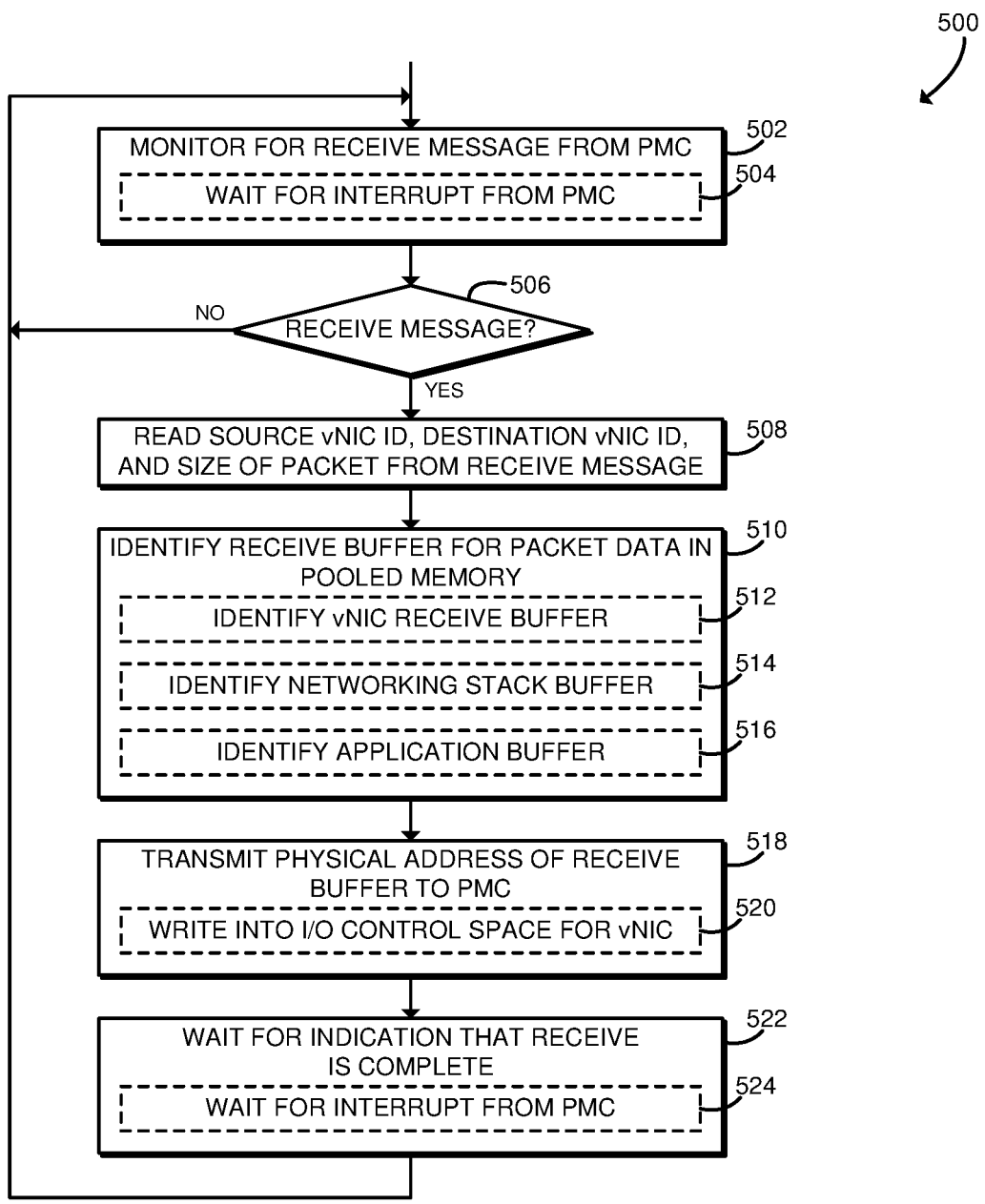
FIG. 5 is a simplified flow diagram of at least one embodiment of a method for receiving network data using pooled memory that may executed by a compute node of FIGS. 1 and 2.

Referring now to FIG. 5, in use, a compute node 110 may execute a method 500 for receiving network packets using pooled memory. The method 500 begins with block 502, in which the compute node 110 monitors for receive messages received from the pooled memory controller 140. As described above, the pooled memory controller 140 may transmit a "receive" message to a destination compute node 110 in response to receiving a "send" message from a source compute node 110. The compute node 110 may use any technique to monitor for receive messages from the pooled memory controller 140. In some embodiments, in block 504 the compute node 110 may wait for an interrupt from the pooled memory controller 140. In block 506, the compute node 110 determines whether a receive message has been received. If not, the method 500 loops back to block 502 to continue monitoring for receive messages. If a receive message was received, the method 500 advances to block 508.

In block 508, the compute node 110 reads the receive message and extracts its included values. In particular, the compute node 110 reads the source vNIC ID, the destination vNIC ID and the packet size from the receive message. The compute node 110 may read the receive message from an I/O space dedicated to the vNIC module 210.

In block 510, the compute node 110 identifies a receive buffer for the packet data in the pooled memory 142. The receive buffer may be identified by the starting physical memory address of the receive buffer in the pooled memory 142. The receive buffer is large enough to contain all of the packet data; that is, the receive buffer may be as large as or greater than the packet size specified in the receive message. The compute node 110 may use any technique to identify the receive buffer. For example, the compute node 110 may allocate a new buffer, identify a previously-allocated buffer, or reuse an existing buffer. In some embodiments, in block 512 the compute node 110 may identify a vNIC buffer 212 managed by the vNIC module 210. The vNIC buffer 212 may be located in kernel space or otherwise managed by the vNIC module 210, and thus the packet data may be copied to user space after being received in order to be used by the application 202. In some embodiments, in block 514 the compute node 110 may identify a networking stack buffer 208 managed by the networking stack 206. The networking stack buffer 208 may be located in kernel space or otherwise managed by an operating system of the compute node 110, and thus the packet data may be copied to the user space after being received in order to be used by the application 202. However, by receiving the packet data directly in the networking stack buffer 208, one or more copies of the packet data may be avoided (e.g., a copy from the vNIC buffer 212 to the networking stack buffer 208 may be avoided).

In some embodiments, in block 516, the compute node 110 may identify an application buffer 204 maintained by the application 202. The application buffer 204 may be located in user space and managed directly by the application 202. Thus, receiving the packet data directly in the application buffer 204 may further reduce the number of copies made of the packet data (e.g. by eliminating copies from the vNIC buffer 212 and/or the networking stack buffer 208 to the application buffer 204).

In block 518, the compute node 110 transmits the physical address of the receive buffer to the pooled memory controller 140. As described above, in response to receipt of the physical address, the pooled memory controller 140 copies the packet data within the pooled memory 142 from memory accessible to the source compute node 110 into the receive buffer, which is accessible by the destination compute node 110. The compute node 110 may use any technique to transmit the physical address. In some embodiments, in block 520 the compute node 110 may write the physical address into I/O space dedicated to the vNIC module 210.

In block 522, the compute node 110 waits for a notification from the pooled memory controller 140 that the network packet receive is complete. The compute node 110 may use any technique to wait for notification from the pooled memory controller 140. In some embodiments, in block 524, the compute node 110 waits for an interrupt generated by the pooled memory controller 140. After the packet receive is complete, the compute node 110 may deliver the received packet data to the application 202, for example by copying the packet data to the networking stack buffer 208, the application buffer 204, or otherwise notifying the application 202. After receiving a notification that the send operation is complete, the method 500 loops back to block 502 to monitor for additional receive messages.

EXAMPLES

Illustrative examples of the devices, systems, and methods disclosed herein are provided below. An embodiment of the devices, systems, and methods may include any one or more, and any combination of, the examples described below.

Example 1 includes a pooled memory controller for inter-node communication in a pooled memory architecture, the pooled memory controller comprising a pooled memory access module to manage remote access by a first compute node and a second compute node to a pooled memory; a virtual network interface controller (vNIC) interface module to receive a send message from the first compute node, wherein the send message includes a source vNIC identifier (vNIC ID) associated with the first compute node, a destination vNIC ID associated with the second compute node, and a sender physical memory address, and wherein the sender physical memory address identifies packet data within the pooled memory; transmit a receive message to the second compute node, wherein the receive message includes the source vNIC ID and the destination vNIC ID; and receive a receiver physical memory address from the second compute node in response to transmission of the receive message, wherein the receiver physical memory address identifies a memory location within the pooled memory; and a data copy module to copy the packet data from the sender physical memory address to the receiver physical memory address within the pooled memory in response to receipt of the receiver physical memory address.

Example 2 includes the subject matter of Example 1, and wherein to receive the send message comprises to read a first memory location within a first input/output (I/O) space of the pooled memory controller dedicated to the first compute node.

Example 3 includes the subject matter of any of Examples 1 and 2, and wherein to transmit the receive message comprises to write to a second memory location within a second I/O space of the pooled memory controller dedicated to the second compute node; and generate an interrupt to the second compute node in response to writing to the second memory location.

Example 4 includes the subject matter of any of Examples 1-3, and wherein to receive the receiver physical memory address comprises to read the second memory location within the second I/O space.

Example 5 includes the subject matter of any of Examples 1-4, and wherein the send message further includes a packet size of the packet data; the receive message further includes the packet size of the packet data; and to copy the packet data comprises to copy an amount of data equal to the packet size of the packet data.

Example 6 includes the subject matter of any of Examples 1-5, and wherein the vNIC interface module is further to notify the first compute node and the second compute node that the copying is complete in response to copying of the packet data.

Example 7 includes the subject matter of any of Examples 1-6, and wherein to notify the first compute node and the second compute node that the copying is complete comprises to generate a first interrupt to the first compute node; and generate a second interrupt to the second compute node.

Example 8 includes a compute node for inter-node communication in a pooled memory architecture, the compute node comprising a virtual network interface controller identifier (vNIC ID) module to determine a destination vNIC ID associated with a destination network address of a network packet; and a send module to determine a physical address of packet data of the network packet, wherein the physical address identifies a memory location within a pooled memory accessible to the compute node; generate a send message, wherein the send message includes a source vNIC ID associated with the compute node, the destination vNIC ID, and the physical address; and transmit the send message to a pooled memory controller, wherein the compute node is to remotely access the pooled memory via the pooled memory controller.

Example 9 includes the subject matter of Example 8, and wherein to determine the physical address comprises to copy the packet data to a kernel-mode driver buffer located at the physical address.

Example 10 includes the subject matter of any of Examples 8 and 9, and wherein to copy the packet data comprises to copy the packet data from a kernel-mode networking stack buffer located within the pooled memory.

Example 11 includes the subject matter of any of Examples 8-10, and wherein to copy the packet data comprises to copy the packet data from a user-mode application buffer located within the pooled memory.

Example 12 includes the subject matter of any of Examples 8-11, and wherein to determine the physical address comprises to determine the physical address of a user-mode application buffer located within the pooled memory.

Example 13 includes the subject matter of any of Examples 8-12, and wherein to transmit the send message comprises to write to a first memory location within an input/output (I/O) space of the compute node dedicated to the pooled memory controller.

Example 14 includes the subject matter of any of Examples 8-13, and wherein the send message further includes a packet size of the packet data.

Example 15 includes the subject matter of any of Examples 8-14, and wherein the send module is further to wait, in response to transmission of the send message, for a notification from the pooled memory controller that the send is complete.

Example 16 includes the subject matter of any of Examples 8-15, and wherein to wait for the notification comprises to wait for an interrupt from the pooled memory controller.

Example 17 includes a compute node for inter-node communication in a pooled memory architecture, the compute node comprising a receive module to receive a receive message from a pooled memory controller, wherein the compute node is to remotely access packet data stored in a pooled memory via the pooled memory controller; identify a physical memory address of a receive buffer within the pooled memory accessible to the compute node, wherein the receive buffer is capable of storing the packet data; and transmit the physical memory address of the receive buffer to the pooled memory controller in response to receipt of the receive message.

Example 18 includes the subject matter of Example 17, and wherein the receive buffer comprises a kernel-mode driver buffer located within the pooled memory.

Example 19 includes the subject matter of any of Examples 17 and 18, and wherein the receive buffer comprises a kernel-mode networking stack buffer located within the pooled memory.

Example 20 includes the subject matter of any of Examples 17-19, and wherein the receive buffer comprises a user-mode application buffer located within the pooled memory.

Example 21 includes the subject matter of any of Examples 17-20, and wherein to receive the receive message comprises to receive an interrupt from the pooled memory controller; and read from a first memory location within an input/output (I/O) space of the compute node dedicated to the pooled memory controller in response to receipt of the interrupt.

Example 22 includes the subject matter of any of Examples 17-21, and wherein to transmit the physical memory address comprises to write to the first memory location within the I/O space.

Example 23 includes the subject matter of any of Examples 17-22, and wherein the receive message further includes a packet size of the packet data; and the receive buffer is capable of storing the packet size amount of data.

Example 24 includes the subject matter of any of Examples 17-23, and wherein the receive module is further to wait, in response to transmission of the physical memory address, for a notification from the pooled memory controller that the receive is complete.

Example 25 includes the subject matter of any of Examples 17-24, and wherein to wait for the notification comprises to wait for an interrupt from the pooled memory controller.

Example 26 includes a system for inter-node communication in a pooled memory architecture, the system comprising a pooled memory controller, a first compute node, and a second compute node, wherein the pooled memory controller comprises a pooled memory access module to manage remote access by the first compute node and the second compute node to a pooled memory; a virtual network interface controller (vNIC) interface module to receive a send message from the first compute node, wherein the send message includes a source vNIC identifier (vNIC ID) associated with the first compute node, a destination vNIC ID associated with the second compute node, and a sender physical memory address, and wherein the sender physical memory address identifies packet data within the pooled memory; transmit a receive message to the second compute node, wherein the receive message includes the source vNIC ID and the destination vNIC ID; and receive a receiver physical memory address from the second compute node in response to transmission of the receive message, wherein the receiver physical memory address identifies a memory location within the pooled memory; and a data copy module to copy the packet data from the sender physical memory address to the receiver physical memory address within the pooled memory in response to receipt of the receiver physical memory address.

Example 27 includes the subject matter of Example 26, and wherein the first compute node comprises a virtual network interface controller identifier (vNIC ID) module to determine a destination vNIC ID associated with a destination network address of a network packet; and a send module to determine the sender physical address of the packet data of the network packet, wherein the sender physical address identifies a memory location within the pooled memory accessible to the first compute node; generate the send message, wherein the send message includes the source vNIC ID, the destination vNIC ID, and the physical address; and transmit the send message to the pooled memory controller, wherein the compute node is to remotely access the pooled memory via the pooled memory controller.

Example 28 includes the subject matter of any of Examples 26 and 27, and wherein the second compute node comprises a receive module to receive the receive message from the pooled memory controller, wherein the second compute node is to remotely access the packet data stored in the pooled memory via the pooled memory controller; identify the receiver physical memory address of a receive buffer within the pooled memory, wherein the receive buffer is capable of storing the packet data; and transmit the receiver physical memory address of the receive buffer to the pooled memory controller in response to receipt of the receive message.

Example 29 includes a method for inter-node communication in a pooled memory architecture, the method comprising receiving, by a pooled memory controller, a send message from a first compute node, wherein the send message includes a source virtual network interface controller identifier (vNIC ID) associated with the first compute node, a destination vNIC ID associated with a second compute node, and a sender physical memory address, and wherein the sender physical memory address identifies packet data within a pooled memory accessible to the first compute node; transmitting, by the pooled memory controller, a receive message to the second compute node, wherein the receive message includes the source vNIC ID and the destination vNIC ID; receiving, by the pooled memory controller, a receiver physical memory address from the second compute node in response to transmitting the receive message, wherein the receiver physical memory address identifies a memory location within the pooled memory accessible to the second compute node; and copying, by the pooled memory controller, the packet data from the sender physical memory address to the receiver physical memory address within the pooled memory.

Example 30 includes the subject matter of Example 29, and wherein receiving the send message comprises reading a first memory location within a first input/output (I/O) space of the pooled memory controller dedicated to the first compute node.

Example 31 includes the subject matter of any of Examples 29 and 30, and wherein transmitting the receive message comprises writing to a second memory location within a second I/O space of the pooled memory controller dedicated to the second compute node; and generating an interrupt to the second compute node in response to writing to the second memory location.

Example 32 includes the subject matter of any of Examples 29-31, and wherein receiving the receiver physical memory address comprises reading the second memory location within the second I/O space.

Example 33 includes the subject matter of any of Examples 29-32, and wherein the send message further includes a packet size of the packet data; the receive message further includes the packet size of the packet data; and copying the packet data comprises copying an amount of data equal to the packet size of the packet data.

Example 34 includes the subject matter of any of Examples 29-33, and further including notifying, by the pooled memory controller, the first compute node and the second compute node that copying is complete in response to copying the packet size amount of data.

Example 35 includes the subject matter of any of Examples 29-34, and wherein notifying the first compute node and the second compute node that copying is complete comprises generating a first interrupt to the first compute node; and generating a second interrupt to the second compute node.

Example 36 includes a method for inter-node communication in a pooled memory architecture, the method comprising determining, by a compute node, a destination virtual network interface controller identifier (vNIC ID) associated with a destination network address of a network packet; determining, by the compute node, a physical address of packet data of the network packet, wherein the physical address identifies a memory location within a pooled memory accessible to the compute node; generating, by the compute node, a send message, wherein the send message includes a source vNIC ID associated with the compute node, the destination vNIC ID, and the physical address; transmitting, by the compute node, the send message to a pooled memory controller, wherein the compute node remotely accesses the pooled memory via the pooled memory controller.

Example 37 includes the subject matter of Example 36, and wherein determining the physical address comprises copying the packet data to a kernel-mode driver buffer located at the physical address.

Example 38 includes the subject matter of any of Examples 36 and 37, and wherein copying the packet data comprises copying the packet data from a kernel-mode networking stack buffer located within the pooled memory.

Example 39 includes the subject matter of any of Examples 36-38, and wherein copying the packet data comprises copying the packet data from a user-mode application buffer located within the pooled memory.

Example 40 includes the subject matter of any of Examples 36-39, and wherein determining the physical address comprises determining the physical address of a user-mode application buffer located within the pooled memory.

Example 41 includes the subject matter of any of Examples 36-40, and wherein transmitting the send message comprises writing to a first memory location within an input/output (I/O) space of the compute node dedicated to the pooled memory controller.

Example 42 includes the subject matter of any of Examples 36-41, and wherein the send message further includes a packet size of the packet data.

Example 43 includes the subject matter of any of Examples 36-42, and further including waiting, by the compute node in response to transmitting the send message, for a notification from the pooled memory controller that the send is complete.

Example 44 includes the subject matter of any of Examples 36-43, and wherein waiting for the notification comprises waiting for an interrupt from the pooled memory controller.

Example 45 includes a method for inter-node communication in a pooled memory architecture, the method comprising receiving, by a compute node, a receive message from a pooled memory controller, wherein the compute node remotely accesses packet data stored in a pooled memory via the pooled memory controller; identifying, by the compute node, a physical memory address of a receive buffer within the pooled memory accessible to the compute node, wherein the receive buffer is capable of storing the packet data; and transmitting, by the compute node, the physical memory address of the receive buffer to the pooled memory controller in response to receiving the receive message.

Example 46 includes the subject matter of Example 45, and wherein identifying the receive buffer comprises identifying a kernel-mode driver buffer located within the pooled memory.

Example 47 includes the subject matter of any of Examples 45 and 46, and wherein identifying the receive buffer comprises identifying a kernel-mode networking stack buffer located within the pooled memory.

Example 48 includes the subject matter of any of Examples 45-47, and wherein identifying the receive buffer comprises identifying a user-mode application buffer located within the pooled memory.

Example 49 includes the subject matter of any of Examples 45-48, and wherein receiving the receive message comprises receiving an interrupt from the pooled memory controller; and reading from a first memory location within an input/output (I/O) space of the compute node dedicated to the pooled memory controller in response to receiving the interrupt.

Example 50 includes the subject matter of any of Examples 45-49, and wherein transmitting the physical memory address comprises writing to the first memory location within the I/O space.

Example 51 includes the subject matter of any of Examples 45-50, and wherein the receive message further includes a packet size of the packet data; and the receive buffer is capable of storing the packet size amount of data.

Example 52 includes the subject matter of any of Examples 45-51, and further including waiting, by the compute node in response to transmitting the physical memory address, for a notification from the pooled memory controller indicating that the receive is complete.

Example 53 includes the subject matter of any of Examples 45-52, and wherein waiting for the notification comprises waiting for an interrupt from the pooled memory controller.

Example 54 includes a computing device comprising a processor; and a memory having stored therein a plurality of instructions that when executed by the processor cause the computing device to perform the method of any of Examples 29-53.

Example 55 includes one or more machine readable storage media comprising a plurality of instructions stored thereon that in response to being executed result in a computing device performing the method of any of Examples 29-53.

Example 56 includes a computing device comprising means for performing the method of any of Examples 29-53.

Example 57 includes a pooled memory controller for inter-node communication in a pooled memory architecture, the pooled memory controller comprising means for receiving a send message from a first compute node, wherein the send message includes a source virtual network interface controller identifier (vNIC ID) associated with the first compute node, a destination vNIC ID associated with a second compute node, and a sender physical memory address, and wherein the sender physical memory address identifies packet data within a pooled memory accessible to the first compute node; means for transmitting a receive message to the second compute node, wherein the receive message includes the source vNIC ID and the destination vNIC ID; means for receiving a receiver physical memory address from the second compute node in response to transmitting the receive message, wherein the receiver physical memory address identifies a memory location within the pooled memory accessible to the second compute node; and means for copying the packet data from the sender physical memory address to the receiver physical memory address within the pooled memory.

Example 58 includes the subject matter of Example 57, and wherein the means for receiving the send message comprises means for reading a first memory location within a first input/output (I/O) space of the pooled memory controller dedicated to the first compute node.

Example 59 includes the subject matter of any of Examples 57 and 58, and wherein the means for transmitting the receive message comprises means for writing to a second memory location within a second I/O space of the pooled memory controller dedicated to the second compute node; and means for generating an interrupt to the second compute node in response to writing to the second memory location.

Example 60 includes the subject matter of any of Examples 57-59, and wherein the means for receiving the receiver physical memory address comprises means for reading the second memory location within the second I/O space.

Example 61 includes the subject matter of any of Examples 57-60, and wherein the send message further includes a packet size of the packet data; the receive message further includes the packet size of the packet data; and the means for copying the packet data comprises means for copying an amount of data equal to the packet size of the packet data.

Example 62 includes the subject matter of any of Examples 57-61, and further including means for notifying the first compute node and the second compute node that copying is complete in response to copying the packet size amount of data.

Example 63 includes the subject matter of any of Examples 57-62, and wherein the means for notifying the first compute node and the second compute node that copying is complete comprises means for generating a first interrupt to the first compute node; and means for generating a second interrupt to the second compute node.

Example 64 includes a compute node for inter-node communication in a pooled memory architecture, the compute node comprising means for determining a destination virtual network interface controller identifier (vNIC ID) associated with a destination network address of a network packet; means for determining a physical address of packet data of the network packet, wherein the physical address identifies a memory location within a pooled memory accessible to the compute node; means for generating a send message, wherein the send message includes a source vNIC ID associated with the compute node, the destination vNIC ID, and the physical address; means for transmitting the send message to a pooled memory controller, wherein the compute node remotely accesses the pooled memory via the pooled memory controller.

Example 65 includes the subject matter of Example 64, and wherein the means for determining the physical address comprises means for copying the packet data to a kernel-mode driver buffer located at the physical address.

Example 66 includes the subject matter of any of Examples 64 and 65, and wherein the means for copying the packet data comprises means for copying the packet data from a kernel-mode networking stack buffer located within the pooled memory.

Example 67 includes the subject matter of any of Examples 64-66, and wherein the means for copying the packet data comprises means for copying the packet data from a user-mode application buffer located within the pooled memory.

Example 68 includes the subject matter of any of Examples 64-67, and wherein the means for determining the physical address comprises means for determining the physical address of a user-mode application buffer located within the pooled memory.

Example 69 includes the subject matter of any of Examples 64-68, and wherein the means for transmitting the send message comprises means for writing to a first memory location within an input/output (I/O) space of the compute node dedicated to the pooled memory controller.

Example 70 includes the subject matter of any of Examples 64-69, and wherein the send message further includes a packet size of the packet data.

Example 71 includes the subject matter of any of Examples 64-70, and further including means for waiting, in response to transmitting the send message, for a notification from the pooled memory controller that the send is complete.

Example 72 includes the subject matter of any of Examples 64-71, and wherein the means for waiting for the notification comprises means for waiting for an interrupt from the pooled memory controller.

Example 73 includes a compute node for inter-node communication in a pooled memory architecture, the compute node comprising means for receiving a receive message from a pooled memory controller, wherein the compute node remotely accesses packet data stored in a pooled memory via the pooled memory controller; means for identifying a physical memory address of a receive buffer within the pooled memory accessible to the compute node, wherein the receive buffer is capable of storing the packet data; and means for transmitting the physical memory address of the receive buffer to the pooled memory controller in response to receiving the receive message.

Example 74 includes the subject matter of Example 73, and wherein the means for identifying the receive buffer comprises means for identifying a kernel-mode driver buffer located within the pooled memory.

Example 75 includes the subject matter of any of Examples 73 and 74, and wherein the means for identifying the receive buffer comprises means for identifying a kernel-mode networking stack buffer located within the pooled memory.

Example 76 includes the subject matter of any of Examples 73-75, and wherein the means for identifying the receive buffer comprises means for identifying a user-mode application buffer located within the pooled memory.

Example 77 includes the subject matter of any of Examples 73-76, and wherein the means for receiving the receive message comprises means for receiving an interrupt from the pooled memory controller; and means for reading from a first memory location within an input/output (I/O) space of the compute node dedicated to the pooled memory controller in response to receiving the interrupt.

Example 78 includes the subject matter of any of Examples 73-77, and wherein the means for transmitting the physical memory address comprises means for writing to the first memory location within the I/O space.

Example 79 includes the subject matter of any of Examples 73-78, and wherein the receive message further includes a packet size of the packet data; and the receive buffer is capable of storing the packet size amount of data.

Example 80 includes the subject matter of any of Examples 73-79, and further including means for waiting, in response to transmitting the physical memory address, for a notification from the pooled memory controller indicating that the receive is complete.

Example 81 includes the subject matter of any of Examples 73-80, and wherein the means for waiting for the notification comprises means for waiting for an interrupt from the pooled memory controller.

The invention claimed is:

1. A pooled memory controller for inter-node communication in a pooled memory architecture, the pooled memory controller comprising:
   a pooled memory access module to manage remote access by a first compute node and a second compute node to a pooled memory via an interconnect, wherein the interconnect couples the first compute node and the pooled memory controller, and wherein the interconnect couples the second compute node and the pooled memory controller;
   a virtual network interface controller (vNIC) interface module to:
      receive a send message from the first compute node via the interconnect, wherein the send message includes a source vNIC identifier (vNIC ID) associated with the first compute node, a destination vNIC ID associated with the second compute node, and a sender physical memory address, and wherein the sender physical memory address identifies packet data within the pooled memory;
      transmit a receive message to the second compute node via the interconnect, wherein the receive message includes the source vNIC ID and the destination vNIC ID; and
      receive a receiver physical memory address from the second compute node via the interconnect in response to transmission of the receive message, wherein the receiver physical memory address identifies a memory location within the pooled memory; and
   a data copy module to copy the packet data from the sender physical memory address to the receiver physical memory address within the pooled memory in response to receipt of the receiver physical memory address.

2. The pooled memory controller of claim 1, wherein to receive the send message comprises to read a first memory location within a first input/output (I/O) space of the pooled memory controller dedicated to the first compute node.

3. The pooled memory controller of claim 2, wherein to transmit the receive message comprises to:
   write to a second memory location within a second I/O space of the pooled memory controller dedicated to the second compute node; and
   generate an interrupt to the second compute node in response to writing to the second memory location.

4. The pooled memory controller of claim 1, wherein the vNIC interface module is further to notify the first compute node and the second compute node that the copying is complete in response to copying of the packet data.

5. The pooled memory controller of claim 4, wherein to notify the first compute node and the second compute node that the copying is complete comprises to:
   generate a first interrupt to the first compute node; and
   generate a second interrupt to the second compute node.

6. One or more non-transitory, computer-readable storage media comprising a plurality of instructions that in response to being executed cause a pooled memory controller to:
   receive a send message from a first compute node via an interconnect coupling the first compute node and the pooled memory controller, wherein the send message includes a source virtual network interface controller identifier (vNIC ID) associated with the first compute node, a destination vNIC ID associated with a second compute node, and a sender physical memory address, and wherein the sender physical memory address identifies packet data within a pooled memory accessible to the first compute node;

transmit a receive message to the second compute node via an interconnect coupling the second compute node and the pooled memory controller, wherein the receive message includes the source vNIC ID and the destination vNIC ID;

receive a receiver physical memory address from the second compute node via the interconnect in response to transmitting the receive message, wherein the receiver physical memory address identifies a memory location within the pooled memory accessible to the second compute node; and copy the packet data from the sender physical memory address to the receiver physical memory address within the pooled memory.

7. The one or more non-transitory, computer-readable storage media of claim 6, wherein to receive the send message comprises to read a first memory location within a first input/output (I/O) space of the pooled memory controller dedicated to the first compute node.

8. The one or more non-transitory, computer-readable storage media of claim 7, wherein to transmit the receive message comprises to:

write to a second memory location within a second I/O space of the pooled memory controller dedicated to the second compute node; and generate an interrupt to the second compute node in response to writing to the second memory location.

9. The one or more non-transitory, computer-readable storage media of claim 6, further comprising a plurality of instructions that in response to being executed cause the pooled memory controller to notify the first compute node and the second compute node that copying is complete in response to copying the packet size amount of data.

10. The one or more non-transitory, computer-readable storage media of claim 9, wherein to notify the first compute node and the second compute node that copying is complete comprises to:

generate a first interrupt to the first compute node; and
generate a second interrupt to the second compute node.

* * * * *